UNITED STATES PATENT OFFICE.

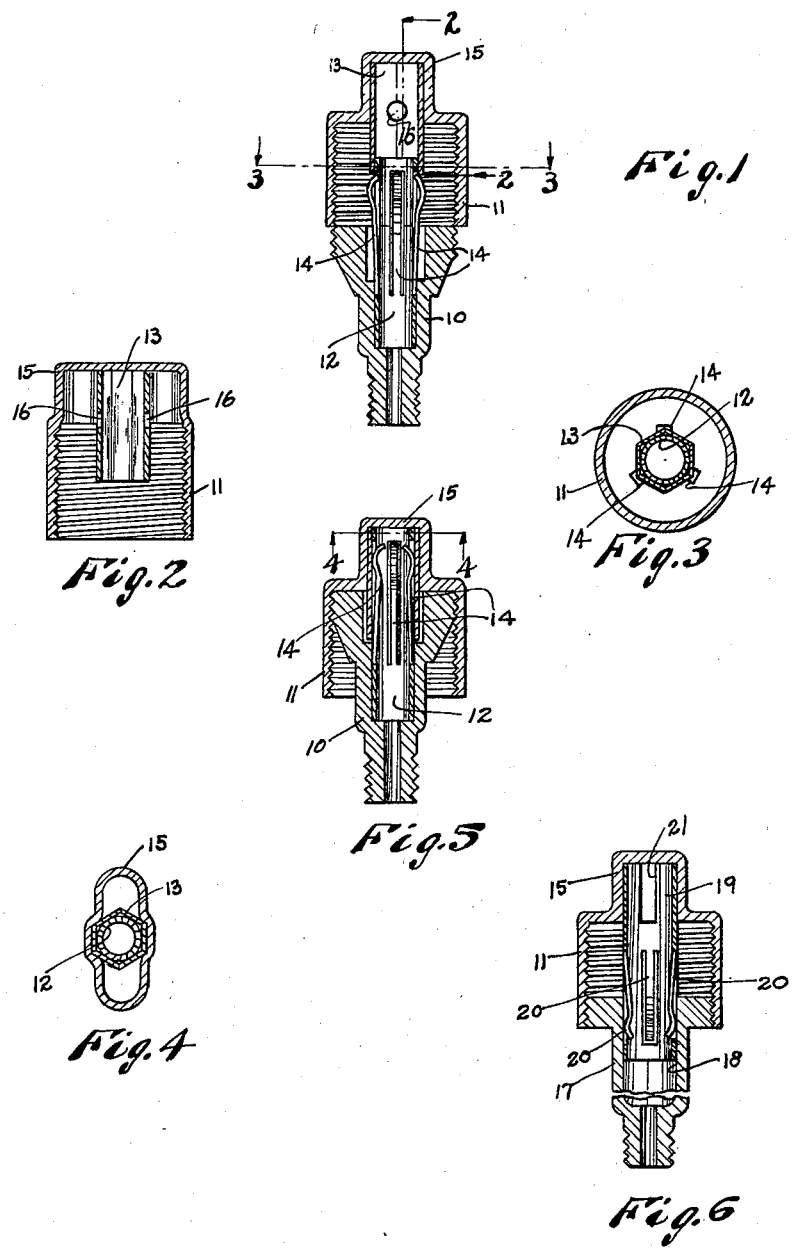

JOSEPH HECKENBACH, OF CHICAGO, ILLINOIS, ASSIGNOR TO QUALITY HARDWARE & MACHINE COMPANY, OF CHICAGO, ILLINOIS, A COPARTNERSHIP COMPOSED OF HILDING ALBERT LAYSTROM, CARL ARTHUR LAYSTROM, AND JERRY ANDERSON.

GREASE-CUP.

1,385,373.     Specification of Letters Patent.     Patented July 26, 1921.

Application filed October 25, 1920. Serial No. 419,354.

*To all whom it may concern:*

Be it known that I, JOSEPH HECKENBACH, a citizen of the United States, and a resident of the city of Chicago, county of Cook, and State of Illinois, have invented certain new and useful Improvements in Grease-Cups, of which the following is a specification.

My invention relates to grease cups and it has for its principal object the provision of a new and improved construction by which a threaded cup shall be guided into engagement with a coöperating threaded stud for preventing a crossing of the threads, by which means is provided for preventing accidental unscrewing of the cup from position, and by which an improved operation is attained.

Other objects will appear hereinafter.

The invention consists in the combinations and arrangements of parts hereinafter described and claimed.

The invention will be best understood by reference to the accompanying drawings forming a part of this specification, and in which, Figure 1 is substantially a central vertical section through my improved device;

Fig. 2 is a vertical section taken at line 2—2 in Fig. 1.

Fig. 3 is a horizontal section taken at line 3—3 of Fig. 1.

Fig. 4 is a horizontal section taken at line 4—4 of Fig. 5.

Fig. 5 is a vertical section similar to Fig. 1 but showing a changed position of the parts; and Fig. 6 is substantially a central vertical section through a modified form of device.

Referring to Figs. 1 to 5 inclusive, 10 indicates a stud provided with screw threads at its lower end for screwing it in position with respect to a bearing, and being provided with screw threads at its upper end for securing a cup thereon; 11 indicates a cup provided with screw threads adapted to fit upon the stud 10 as is common practice in the manufacture of devices of this type. As is fully understood, in practice the cup 11 is to be filled with a supply of lubricating material and to be screwed into position on the stud, the cup being lowered with respect to the stud from time to time for forcing the grease from the cup downwardly through a central opening in the stud. Fig. 1 shows the cup 11 in position for effecting engagement between the threads of the cup and the threads of the stud, while Fig. 5 shows the parts in position with the grease exhausted from the cup.

Means is provided for alining the cup and the stud with respect to each other for effecting a proper engagement between the threads of these members, being adapted to be operative at the time when such engagement is about to take place. This means in the construction shown comprises a tube 12 secured in central position with respect to the stud 10, being adapted to extend into a second tube 13 carried by the cup 11 in concentric position therein. As is best shown in Fig. 1, the tube 12 is provided with a plurality of spring fingers 14 so positioned upon the tube 12 as to engage the end of the tube 13 at the time when the threads of the stud 10 are about to engage the threads of the cup 11. In the construction shown three of the fingers 14 are provided, spaced evenly about the periphery of the tube 12, whereby the cup 11 is supported by such spring fingers in alinement with the stud 10.

The tube 12 has a tendency to center the stud and the cup with respect to each other by reason of its snug engagement with the tube 13 independently of the action of the spring fingers 14. The engagement between the tubes 12 and 13 is particularly effective for centering and alining the members with respect to each other by reason of the point of engagement between such tubes being at some little distance outside of the plane within which engagement occurs between the threads of the stud 10 and the cup 11, as will be readily appreciated.

As is clearly shown in Fig. 1, the spring fingers 14 are cut out from the wall of the tube 12 being bent into the desired form so as to stand normally in slightly projecting position with respect to the tube as shown in that figure. I have found that fingers cut out in this manner from the stock of a commercial tube have the required amount of resiliency without any special treatment.

As is clearly shown in Figs. 3 and 4, the tube 13 is angular in cross section, being of hexagonal form in the construction shown. As will be readily understood, when the cup 11 is screwed into position upon the stud 10, the fingers 14 are forced inwardly so as to enter the tube 13. When the cup 11 is turned so as to cause the fingers 14 to stand opposite the angles of the tube 13, the fingers are permitted to project very slightly outwardly, having thus a yielding ratchet engagement with the tube. The fingers 14 accordingly offer a slight yielding resistance to rotary movement of the cup 11 with respect to the stud 10, this resistance being sufficiently effective to prevent accidental unscrewing of the cup 11 from the stud 10.

The cup 11 is provided at its upper end with an extension 15 of reduced size within which the tube 13 is secured, the extension being of a vertical length for accommodating the tube 12 as is shown in Fig. 5. As the cup 11 is lowered with respect to the stud 10, the grease from the cup is forced through the tube 12, being adapted to enter the tube 12 through openings about the fingers 14, and through openings 16 in the sides of the tube 13 as is shown in Figs. 1 and 2. As is best shown in Fig. 1, the stud 10 is also bored out about the tube 12 to receive the lower end of the tube 13, as also shown in Fig. 5.

By reason of the square formation of the cup 11 at its upper end portion, substantially all of the grease is adapted to be forced out by the screwing down of the cup 11 without any material portion of the grease being left in the cup to harden and prevent proper flow of the grease at its next application.

In Fig. 6, a modified form of construction is shown comprising a stud 17 having a socket 18 of hexagonal shape corresponding to the socket provided by the tube 13 of the first described construction. A tube 19 corresponding to the tube 12 is mounted in the cup 11 in lieu of being mounted upon the stud. Spring fingers 20 cut from the wall of the tube 19 are adapted to engage the angles of the socket 18 for effecting similar results. A slot 21 is provided in the upper end of the tube 19 for admitting grease from the cup to the interior of the tube 19, corresponding to the function of the opening 16 in the tube 13. It is believed that the operation of the structure shown in Fig. 6 will be readily understood without further description, since the principle of operation is the same as that applicable to the first described structure.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent, is:—

1. The combination of a perforated stud screw-threaded on its outer face, a cup screw-threaded to fit said stud, a tube located concentrically within said cup, a second tube located concentrically with respect to said stud and adapted to have snug engagement with said first named tube, and integral spring means projecting from one of said tubes adapted to engage the other tube for alining the cup and the stud with respect to each other at the time when the threads of said two members are passing into engagement with each other, substantially as described.

2. The combination of a perforated stud screw-threaded on its outer face, a cup screw-threaded to fit said stud, and curved, longitudinal spring means carried by one of said members adapted to engage in a tubular portion of the other member for alining said members with respect to each other at the time when the threads of said two members are passing into engagement with each other, substantially as described.

3. The combination of a perforated stud screw-threaded on its outer face, a cup screw-threaded to fit said stud, a tube carried by one of said members, and longitudinally extending spring fingers carried by the other member adapted to engage said tube for alining said members with respect to each other at the time when the threads of said two members are passing into engagement with each other, substantially as described.

4. The combination of a perforated stud screw-threaded on its outer face, a cup screw-threaded to fit said stud, a tube located concentrically within said cup, a second tube located concentrically with respect to said stud and adapted to have snug engagement with said first named tube, and spring fingers cut out of the wall of one of said tubes adapted to engage the other tube for alining the cup and the stud with respect to each other at the time when the threads of said two members are passing into engagement with each other, substantially as described.

5. The combination of a perforated stud screw-threaded on its outer face, a cup screw-threaded to fit said stud, a tube located concentrically within said cup, a second tube located concentrically with respect to said stud and adapted to have snug engagement with said first named tube, and three spring fingers evenly spaced about and carried by one of said tubes adapted to engage the other tube for alining the cup and the stud with respect to each other at the time when the threads of said two members are passing into engagement with each other, substantially as described.

6. The combination of a perforated stud screw-threaded on its outer face, a cup screw-threaded to fit said stud, a tube carried by one of said members adapted to extend into an angular socket of the other member, and spring means carried by the tube adapted to have yielding engagement with the angles of said socket for preventing accidental unscrewing of the cup, substantially as described.

7. The combination of a perforated stud screw-threaded on its outer face, a cup screw-threaded to fit said stud, a tube carried by one of said members adapted to extend into an angular socket of the other member, and spring fingers cut out of the wall of said tube adapted to have yielding engagement with the angles of said socket for preventing accidental unscrewing of the cup, substantially as described.

8. The combination of a perforated stud screw-threaded on its outer face, a cup screw-threaded to fit said stud, a tube carried by one of said members adapted to extend into a hexagonal socket of the other member, and three spring fingers cut out of the wall of the tube adapted to have yielding engagement with the angles of said socket for preventing accidental unscrewing of the cup, substantially as described.

9. The combination of a perforated stud screw-threaded on its outer face, a cup screw-threaded to fit said stud, a tube mounted on said stud in concentric position with respect thereto, an angular tube mounted within said cup in position to receive said first named tube, and spring means carried by and extending longitudinally along said first named tube to engage the angles of said second named tube for preventing accidental unscrewing of said cup, substantially as described.

10. The combination of a perforated stud screw-threaded on its outer face, a cup screw-threaded to fit said stud, a tube mounted on said stud in concentric position with respect thereto, an angular tube mounted within said cup in position to receive said first named tube, and spring means carried by said first named tube to engage the angles of said second named tube for preventing accidental unscrewing of said cup, said spring means being so positioned as to engage the end of said second named tube at the time when the screw threads of said members pass into engagement with each other for alining said two members with respect to each other, substantially as described.

11. The combination of a perforated stud screw-threaded on its outer face, a cup screw-threaded to fit said stud, a tube mounted on said stud in concentric position with respect thereto, an angular tube mounted within said cup in position to receive said first named tube, and spring fingers cut out of the wall of said first named tube adapted to engage the angles of said second named tube for preventing accidental unscrewing of said cup, substantially as described.

In testimony whereof I have signed my name to this specification in the presence of two subscribing witnesses.

JOSEPH HECKENBACH.

Witnesses:
JOSHUA R. H. POTTS,
B. G. RICHARDS.